Figure 5:
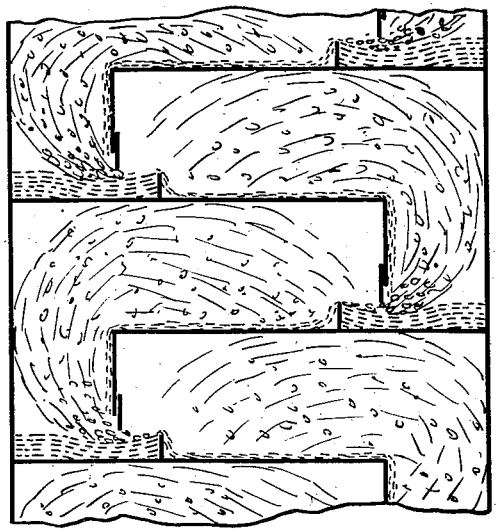

Jan. 13, 1931. T. DE C. TIFFT ET AL 1,789,059
FRACTIONATION
Filed Jan. 23, 1928 2 Sheets-Sheet 1
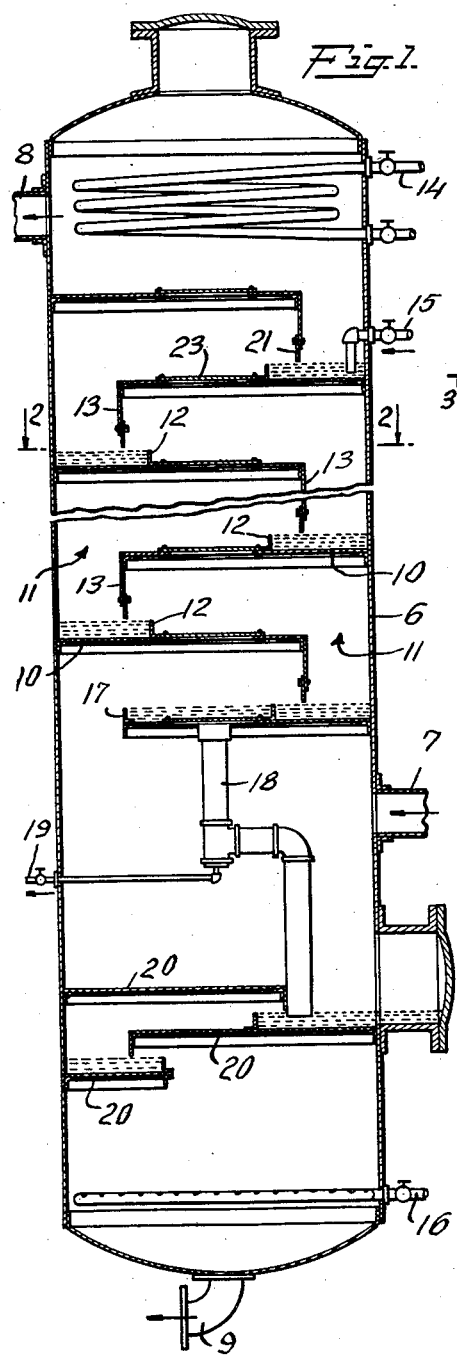
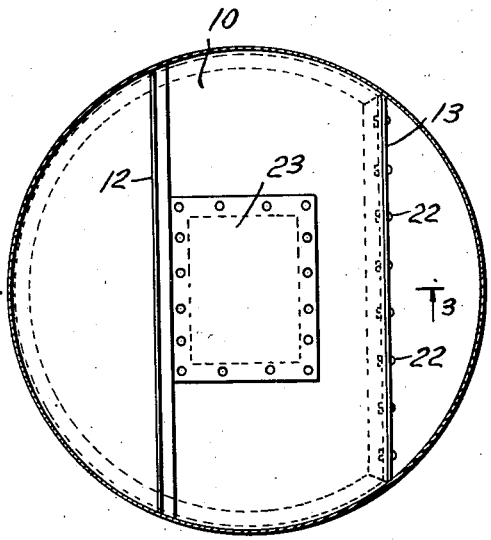
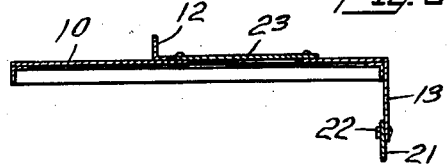
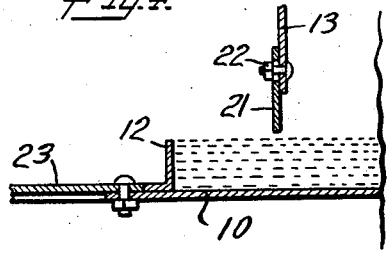
INVENTORS
Thomas d'C. Tifft
William Mendius
BY
Rector, Hibber, Davis Macauley
ATTORNEYS Jan. 13, 1931. T. DE C. TIFFT ET AL 1,789,059
FRACTIONATION
Filed Jan. 23, 1928 2 Sheets-Sheet 2

INVENTORS
Thomas d'C. Tifft
William Mendius
BY
ATTORNEYS

Patented Jan. 13, 1931

1,789,059

UNITED STATES PATENT OFFICE

THOMAS DE COLON TIFFT AND WILLIAM MENDIUS, OF CHICAGO, ILLINOIS, ASSIGNORS TO SINCLAIR REFINING COMPANY, OF NEW YORK, N. Y., A CORPORATION OF MAINE

FRACTIONATION

Application filed January 23, 1928. Serial No. 248,794.

This invention relates to an improved tower for carrying out fractionating, refluxing or stripping operations or the like. The improved tower of the invention has several important advantages; in particular it combines advantages of open baffle towers and so-called bubble towers while eliminating disadvantages of each.

The improved tower of the invention comprises a vertical shell, having a vapor inlet near the lower end and a vapor outlet near the upper end, a series of transverse partitions having openings adjacent alternate sides of the shell, liquid weirs extending across and upwardly from these partitions adapted to retain pools of liquid thereon on the side of the weirs in the direction of vapor travel, and baffles adapted to function as inverted vapor weirs extending across and downwardly from these partitions spaced from the liquid weirs in the direction of vapor travel. This construction provides alternation of high and low vapor velocities through the tower with foaming or bubbling of liquid in regions of high vapor velocity followed by separation of entrained liquid from vapor in regions of low vapor velocity before the vapors enter the next region of high vapor velocity. This makes possible accurate separation of higher and lower boiling components of liquid and vapor. At the same time the tower is susceptible to immediate control and, further, adapts itself to most variations normally encountered in operation. High capacity is also afforded.

This improved tower is of special value and application in the distillation of complex mixtures such as petroleum oils. For example, this tower is well adapted for fractionation of gasoline from gasoline-containing oil or vapor mixtures. The tower of the invention, however, is useful generally for carrying out fractionating, refluxing or stripping operations or the like.

The invention will be further described in connection with the accompanying drawings which illustrate one form of tower embodying the invention as well as, diagrammatically, operation of the improved tower of the invention. In the accompanying drawings, Fig. 1 is a vertical section with parts broken away through a tower embodying the invention, Fig. 2 is a section on line 2—2 of Fig. 1, on an enlarged scale, Fig. 3 is a section on line 3—3 of Fig. 2, Fig. 4 is an enlarged fragmentary detail, and Fig. 5 diagrammatically illustrates the operation of the tower of the invention.

Referring to Fig. 1, the tower illustrated comprises a vertical shell 6 provided with a vapor inlet 7, a vapor outlet 8 and a liquid outlet 9. A series of transverse partitions 10 having openings 11 adjacent alternate sides of the shell are arranged therein. Liquid weirs 12 extending across and upwardly from partitions 10 adapted to retain pools of liquid on the partitions on the side of these weirs in the direction of vapor travel are provided on each of the partitions, except the uppermost, and baffles 13 adapted to function as inverted vapor weirs are provided extending across and downwardly ti.. \ each of the partitions 10, except the lowe:most. These baffles 13 are spaced from the liquid weirs 12 on the next lower partition in the direction of vapor travel to restrict vapor flow over the surface of the liquid pools retained by the liquid weirs to paths of small cross-section immediately beneath the baffles.

For use in refluxing or fractionating operations, the tower may be cooled externally by exposure or partial exposure to the atmosphere, or internally by circulation of a suitable cooling medium through a cooling coil arranged in the upper end of the tower, as illustrated at 14, or by introduction into the upper end of the tower of a refluxing medium vaporizing substantially completely under the conditions of temperature and pressure prevailing in the tower such as a portion of the condensed distillate product escaping from the tower as vapors, for example through a connection as illustrated at 15. For use in stripping operations, heat may be supplied, for example, by direct introduction of steam through a perforated coil arranged in the lower end of the tower, as illustrated at 16, or by circulation of steam or other suitable heating medium through a closed coil arranged in the lower end of the tower. It will be understood that fractionating or refluxing operations and stripping operations may be carried out at the same time in the same tower. Liquid may also be supplied to or withdrawn from intermediate points in the tower by connections similar to that illustrated at 15.

It is advantageous to provide means for conveying liquid from the partition nearest above the vapor inlet to a lower point in the shell. In the tower illustrated, a lip 17 is provided on the lowermost baffle 10 and a connection 18 is arranged to discharge liquid from behind this lip on this partition to a lower point in the shell. Connection 19 may be provided for taking samples of this liquid. Particularly where a stripping operation is carried out in the tower, a few partitions with liquid weirs and baffles, arranged as just described, may be arranged in the tower below the vapor inlet, as shown at 20.

The partition, weir and baffle construction illustrated, in Figs. 2 and 3 particularly, has several advantages. The baffles 13 are made easily adjustable by providing sliding members 21 which can be clamped in any desired position by means of bolts 22 extending through slits in the sliding members. Access for adjusting these baffles is provided by an aligned series of openings having removable closures 23 through the series of partitions 10.

In operation, vapors flowing upwardly through the tower pass in succession through a series of alternating regions of high vapor velocity and low vapor velocity. In the regions of high vapor velocity the vapors are compelled to pass in a restricted path over the surface of the pools of liquid so as to form bubbles or foam providing an enormous surface of contact between liquid and vapor. Entrained liquid separates from the vapors as the mixture enters the next region of low vapor velocity, this separation being promoted by change in the direction of vapor travel. The liquid forming the several pools in the regions of high vapor velocity may be condensate produced from the vapors at a higher point in the tower or may be an introduced liquid or a mixture of these two. The liquid overflows from each pool to the next lower and from the lowest is discharged from the tower. The composition of the liquid differs, of course, through successive pools, the liquid containing decreasing proportions of higher boiling components and increasing proportions of lower boiling components in the direction of vapor travel through the tower.

The pools of liquid maintained beneath the baffles in operation of the tower serve in another capacity giving the improved tower of invention a further important advantage.

Operations in which a uniform flow of vapors of uniform composition exist are exceptional rather than the rule. These usual variations in vapor compositions and vapor volumes involve difficulty of control with most towers. These difficulties are particularly marked with the so-called bubble towers containing a large volume of liquid and consequently requiring a substantial amount of time to come to operating balance following external adjustments. In the improved tower of this invention, variations of vapor volume, of the total vapor volume or of the contained volume of some components, are usually accommodated by depression or elevation of the liquid surface in the liquid pools beneath the baffles, through the tower or in particular regions of the tower, the tower thus adapting itself to such variations as are normally encountered. Due to the relatively small volume of contained liquid, moreover, operating balance follows external adjustments almost immediately with the improved tower of the invention.

This advantage makes the improved tower of the invention of special value and application where it is to handle vapors from some operation over which independent control must be maintained. For example, this tower is particularly useful for direct fractionation of gasoline from vapor mixtures from cracking operations. The ease of control of the improved tower of the invention further adds to its advantages for such purposes.

Another advantage of the improved tower of the invention is the definite maintenance of intimate vapor and liquid contact and the persistent resistance to "channelling" it provides in operation. With the so-called bubble towers, for example, horizontal vapor velocities beneath bubble caps may be high enough to channel through the liquid seal about the cap without adequate contact between vapor and liquid. In the improved tower of this invention, however, any such tendency is eliminated by the flow of liquid downwardly across the path of vapor travel beneath the vapor weirs.

The respective positioning of the liquid weirs and baffles varies for different operations. The baffles may be set so that their lower edges correspond approximately with the static liquid level behind the liquid weirs or they may be set below or above this point. Usually they are set somewhat above this point. The proportions and adjustments of the tower illustrated in Fig. 1 are those of a tower approximately five feet in diameter and thirty feet high having fourteen partitions between the vapor inlet and vapor outlet which has been used successfully in the fractionation of gasoline from pressure cracking still naphthas.

We claim

1. An improved tower comprising a vertical shell having a vapor inlet near the lower end and a vapor outlet near the upper end, a series of transverse imperforate partitions arranged therein between the vapor inlet and vapor outlet, said partitions having openings adjacent alternate sides of the shell, liquid weirs extending across and upwardly from successive partitions, said liquid weirs being adapted to retain pools of liquid on the side of the weirs in the direction of vapor travel, and substantially vertical baffles extending across and downwardly from successive partitions, said baffles being spaced from said liquid weirs in the direction of vapor travel.

2. An improved tower comprising a vertical shell having a vapor inlet near the lower end and a vapor outlet near the upper end, a series of transverse partitions arranged therein between the vapor inlet and vapor outlet, said partitions having openings adjacent alternate sides of the shell, liquid weirs extending across and upwardly from said partitions, said liquid weirs being adapted to retain pools of liquid on the side of the weirs in the direction of vapor travel, adjustable baffles extending across and downwardly from said partitions, said baffles being spaced from said liquid weirs in the direction of vapor travel and an aligned series of openings provided with removable closures through said series of transverse partitions.

3. An improved tower comprising a vertical shell having a vapor inlet near the lower end and a vapor outlet near the upper end, a series of transverse partitions arranged therein between the vapor inlet and vapor outlet, said partitions having openings adjacent alternate sides of the shell, liquid weirs extending across and upwardly from said partitions, said liquid weirs being adapted to retain pools of liquid on the side of the weirs in the direction of vapor travel, and baffles extending across and downwardly from said partitions, said baffles being spaced from said liquid weirs in the direction of vapor travel and terminated above the upper extremities of the liquid weirs associated with the adjacent lower partitions.

4. An improved tower comprising a vertical shell having a vapor inlet near the lower end and a vapor outlet near the upper end, a series of transverse partitions arranged therein between the vapor inlet and vapor outlet, said partitions having openings adjacent alternate sides of the shell, liquid weirs extending across and upwardly from said partitions, said liquid weirs being adapted to retain pools of liquid on the side of the weirs in the direction of vapor travel, baffles extending across and downwardly from said partitions and positioned near the said openings thereto, and an aligned series of openings provided with removable closures through said series of transverse partitions disposed between the baffles and the liquid weirs in the direction of vapor travel.

5. An improved tower comprising a vertical shell having a vapor inlet near the lower end and a vapor outlet near the upper end, a series of transverse imperforate partitions arranged therein between the vapor inlet and vapor outlet, said partitions having openings adjacent alternate sides of the shell, liquid weirs extending across and upwardly from said partitions, said liquid weirs being positioned a substantial distance from the edges of the partitions adjacent the openings thereto, and adapted to retain pools of liquid on the side of the weirs in the direction of vapor travel, and vapor baffles extending across and downwardly from said partitions, said baffles being spaced from said liquid weirs in the direction of vapor travel.

In witness whereof, we have subscribed our names.

THOMAS DE COLON TIFFT.
WILLIAM MENDIUS.